Patented Oct. 20, 1925.

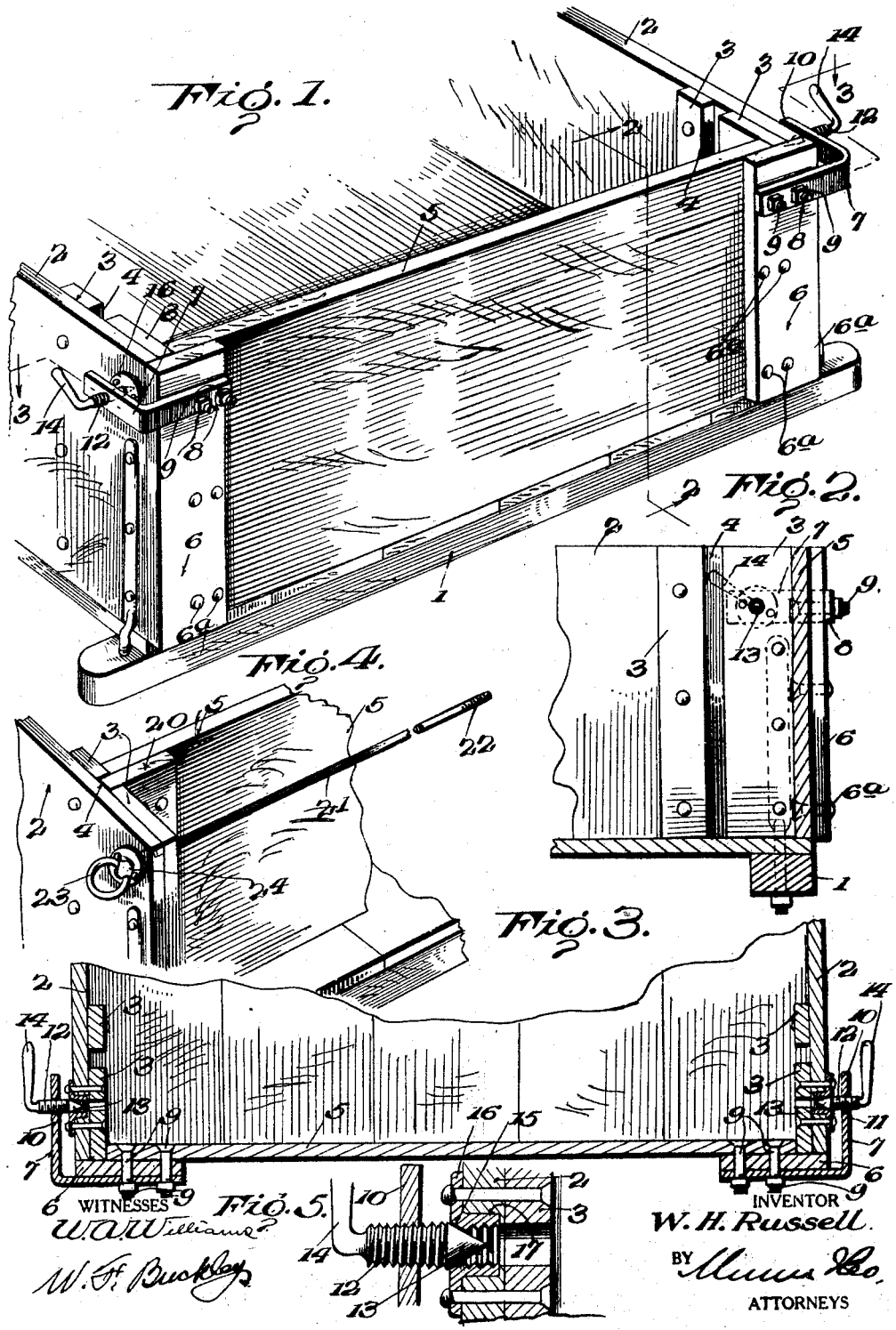

1,558,292

UNITED STATES PATENT OFFICE.

WILLIAM H. RUSSELL, OF CLARKSVILLE, VIRGINIA, ASSIGNOR TO C. H. RUSSELL & SON, INC., OF CLARKSVILLE, VIRGINIA, A CORPORATION OF VIRGINIA.

END GATE FOR WAGONS.

Application filed April 1, 1925. Serial No. 19,929.

*To all whom it may concern:*

Be it known that I, WILLIAM H. RUSSELL, a citizen of the United States, residing at Clarksville, in the county of Mecklenburg, State of Virginia, have invented certain new and useful Improvements in End Gates for Wagons, of which the following is a specification.

This invention relates to an improvement in end gates for wagons and aims to provide an end gate which is so constructed that it may be securely and rigidly fastened to the wagon body in such a way as to make the capacity of the wagon body greater than when an ordinary end gate is employed.

A further object resides in the provision of an end gate wherein the locking or fastening means is mounted entirely on the end gate and is easily operable to securely hold the end gate in position or to release the same.

A still further object resides in the provision of an end gate having a novel form of fastening means and which may be readily converted into a standard end gate if such conversion is found desirable.

Other objects and advantages reside in certain novel features of the construction, arrangement and combination of parts which will be hereinafer more fully described and particularly pointed out in the appended claims, reference being had to the accompanying drawing forming a part of this specification, and in which:

Figure 1 is a fragmentary perspective view showing one embodiment of the invention, Figure 2 is a view in vertical section on the line 2—2 of Figure 1, Figure 3 is a view in horizontal section on the line 3—3 of Figure 1, Figure 4 is a fragmentary perspective view illustrating the gate of Fig. 1 after conversion to provide the ordinary standard gate construcion, and Figure 5 is a fragmentary view, partly in section and partly in elevation, illustrating the manner in which the screws co-act with their washers.

Referring to the drawings the numeral 1 designates generally a wagon body which has sides 2. On the inner faces of the sides 2 strips 3 are mounted, the strips 3 being fastened to the sides and providing guides 4. In the ordinary end gate structure, the end gate has its ends slidably fitted in the guides 4. This cuts down the capacity of the wagon body to some extent since the guides are spaced inwardly from the rear end of the wagon and the present invention aims to provide an end gate structure which will among other things eliminate this undesirable feature. To this end an end gate 5 is provided at its ends with strips or plates 6 which are fastened to the end gate, as at 6ª, and which project beyond the ends of the end gate so as to engage the rear ends of the sides 2, as clearly shown in Fig. 3. When the plates 6 are engaged with the ends of the sides 2 of the wagon body, the end gate has its ends engaged with the adjacent portion of the adjacent strip 3 so as to provide a snug closure for the rear end of the wagon body.

Locking mechanism is provided for securing the end gate in position and comprises a pair of angle brackets, indicated generally at 7, each angle bracket having an arm 8 fastened to the plate 6 and to the end gate 5 by bolts and nuts 9 and an arm 10 which is disposed to extend forwardly in spaced parallel relation with respect to the adjacent side 2 of the wagon body. Each arm 10 has an internally threaded opening or threaded bearing 11 adjacent its outer end. Screws 12 are engaged in the threaded bearings 11. Each screw 12 has a smooth or plain portion 13 at its inner end which is of conical form and at the outer end of each screw 11 a handle 14 is provided. The tapered or conical ends 13 of the screws 12 are designed to engage the walls of openings 15 of washers 16 fastened to the sides 2 of the wagon. One or both of the washers 16 may have internally threaded flanges 17 accommodated in openings formed in the sides of the wagon, the strips 3 opposite the washers 16 and the flanges 17 having openings aligning with the openings of the flanges.

With the arrangement shown in Figures 1 to 3 and 5 the end gate may be easily and readily though firmly fastened or locked to the wagon body by simply placing the same in position and turning the handles 14 to bring the tapered ends 13 of the screws 12 into engagement with the washers 16. This operation pushes the sides 2 of the wagon firmly up against the ends of the end gate 5 and since the tapered ends of the screws 12 enter and engage the openings 15 of the washers the end gate is firmly and securely locked in position. The location of the locking devices adjacent to but spaced from the top of the gate prevents the gate from swinging about the screws 12 as a center. The brackets 7 are constructed of wrought iron and are sufficiently heavy to enable them to serve their purposes but they possess some little degree of resiliency and this is advantageous in that it results in locking of the screws 12 in position.

The end gate shown in Figures 1 to 3 and 5 may be readily converted into an ordinary standard end gate by removing the brackets 7 and sawing away portions of the plates 6 to leave only the sections 20 shown in Fig. 4. This will adapt the ends of the end gate for insertion in the guides 4, as shown in Fig. 4. When the gate is converted to the form shown in Fig. 4 the usual locking rod 21 is employed and is used with the washers 16 in the usual way, the rod being passed through one of the washers and its bushing and having its threaded end 22 threadedly engaged with the bushings of the other washer. A ring 23 is pivoted as usual to the end 24 of the rod.

One of the important features of the end gate arrangement shown in Figures 1 to 3 and 5 constituting the present invention, resides in the fact that all of the locking mechanism is carried on the end gate. No changes whatever are required in the structure of the wagon body which is left exactly the same as it has been constructed and used heretofore. This advantage is, of course, in addition to the feature of enlarging the capacity of the body and in addition to the advantage of the very effective locking action and the feature of convertibility.

I claim:

1. An end gate for use with wagons having sides provided with washers on their outer faces and comprising a gate body adapted to fit between and engage the sides, brackets having portions fastened to the gate body and having arms rigidly connected with said portions and overlying the washers on the sides of the wagon, and screws threadedly connected with said arms and engageable in and with said washers to exert an inward pressure on the sides of the wagon to force the sides against the ends of the end gate and to secure the end gate to the sides of the wagon.

2. A convertible end gate for use with wagons having sides provided with flanged washers on their outer faces, the flanges of the washers being internally threaded to adapt them for use with locking rods, the sides having guide strips on their inner faces, an end gate body adapted to be positioned rearwardly of the guides and between the sides of the wagon, plates fastened to the end gate body and adapted to overlap the rear ends of the wagon sides, angle brackets secured to the plates and to the end gate body and having arms disposed adjacent the washers and screws carried by the arms and cooperable with the washers to hold the end gate in position, the angle bars with their screws being removable and the plates being adapted to be cut away to convert the end gate into standard form for use with the guides of the wagon in the ordinary way.

WILLIAM H. RUSSELL.